Sept. 4, 1956 W. G. HODSON 2,761,973

PHASE SHIFT OSCILLATOR

Filed Oct. 2, 1950 3 Sheets-Sheet 1

INVENTOR:
WALDO G. HODSON

By Herbert E. Metcalf
HIS PATENT ATTORNEY

INVENTOR:
WALDO G. HODSON

By Herbert E. Metcalf
HIS PATENT ATTORNEY

INVENTOR:
WALDO G. HODSON
By Herbert E. Metcalf
HIS PATENT ATTORNEY

United States Patent Office 2,761,973

Patented Sept. 4, 1956

2,761,973

PHASE SHIFT OSCILLATOR

Waldo G. Hodson, Burbank, Calif., assignor to Northrop Aircraft, Inc., Hawthorne, Calif., a corporation of California Application October 2, 1950, Serial No. 187,981

3 Claims. (Cl. 250—36)

The present invention relates to oscillators, and, more particularly, to improvements in a type of phase shift oscillator. The invention is particularly adapted for use as a subcarrier oscillator for a telemetering system.

An amplifier and a phase shifting network will function as an oscillator if the following necessary conditions for oscillation are satisfied. First, the amplitude of the feedback voltage must be sufficient to maintain oscillation, that is, the product of the amplification and the feedback fraction must be equal to, or be greater than, unity. Second, the phase shift, progressing from the input of the amplifier, through the amplifier, the feedback circuit, the input control network and back to the input of the amplifier must be an integral multiple of 360°.

If the oscillator is oscillating at a given frequency as determined by the above factors, and any one of its phase shifting networks is altered, the feedback voltage at this frequency would be out of phase at the input of the amplifier by the amount of phase shift resulting from the alteration. Since this does not satisfy the conditions for oscillation, the oscillator will automatically change to a new frequency such that the overall phase shift through the entire system becomes an integral multiple of 360 degrees.

The conventional phase shift oscillator is a type of resistance-capacity tuned oscillator which employs an RC phase shifting network to connect the input and output of an amplifier together such that the total phase shift, including that presented by the RC network, is 360 degrees at the desired frequency of oscillation.

In order to change the frequency of oscillation, it is necessary to be able to vary the resistance or reactance in the phase shifting network. However, variation in the usual resistance-capacitance phase shifting networks will generally produce a simultaneous variation of output voltage, and also, therefore, of feedback voltage. If the feedback voltage drops too low, oscillation will cease, and if it increases appreciably above the optimum value, the output waveform will be distorted. Thus, if a large range is desired, a large change in output voltage, and also the probability that distortion will be introduced, must be tolerated. The frequency range of the usual resistance-capacity tuned oscillator is limited if good stability and waveform is to be maintained. This is not a desirable feature in a subcarrier oscillator for a telemetering system.

It is, accordingly, an object of this invention to provide an electronic oscillator having an extremely wide frequency range, while at the same time maintaining excellent stability and waveform over this range by the use of a phase shifting circuit which permits an extremely wide frequency-controlling phase variation.

It is another object of the invention to provide frequency control wherein the large range of phase shift obtainable from an amplifier stage, having a reactive load component, is utilized.

It is well known that when the feedback factor of a degenerative amplifier is large, the gain of that amplifier becomes independent of the amplification, so such an amplifier, with degenerative feedback, will have great stability, retaining its overall voltage gain at a constant value for long durations of time despite appreciable supply voltage changes, load impedance changes, temperature fluctuation and mechanical vibrations.

Degenerative feedback also reduces distortion and increases the range of frequency amplification with nearly equal response. Degenerative resistive feedback causes the phase shift through an amplifier, whose load includes a reactive component, to more nearly approach 180°.

Thus, it is an object of the invention to provide control of frequency by the use of a variable current-degeneration control.

It is another object of the invention to provide a series phase shifting network in a constant current circuit and thus make the output voltage substantially constant, regardless of phase changes.

And it is another object of the invention to provide means for coarse and fine adjustment of the frequency of oscillation.

It is a further object of this invention to provide frequency adjustment means which are substantially independent of each other (i. e., free of interaction).

A radio telemetering system for transmitting data obtained from or by means of mechanical motion requires transducers as detectors which will convert mechanical response into electrical signals. Since the transducers will control the amount of phase shift, they are an integral part of the oscillator.

It is a desirable object of this invention to provide a transducer bridge whereby a proportional phase shift is produced due to mechanical motion detection.

It is another object of the invention to provide means for compensation of differences in transducer bridges and for resistive balance because of a reactance component.

A further object, of primary importance in telemetering systems, is to provide a phase shift oscillator which will function accurately and reliably in the presence of strong and sudden mechanical motion which it measures.

A still further object of the invention is to provide a compact oscillator having fewer tubes and component parts than other similar oscillators, thereby providing easy isolation from extraneous fields.

Briefly, the foregoing objects, and other objects ancillary thereto, are preferably accomplished by employing a transducer resistance bridge input control network to a two stage amplifier which utilizes pentode tubes feeding a tuned transformer and variable resistance phase shifting network. Regenerative feedback via the transformer produces and maintains oscillation, and utilizes the large range of phase shift obtainable from an amplifier stage having a reactive component in its load as a means of controlling the center frequency of oscillation over a wide range. Degenerative feedback in the second stage increases stability and provides an additional source of phase shift.

This invention possesses numerous other objects and features, some of which, together with the foregoing, will be set forth in the following description of a preferred embodiment of the invention.

The invention can be more fully understood by reference to the attached drawings, in which.

Figures 4*a*, 4*b*, 4*c* and 4*d* are wiring diagrams and vector diagrams for explaining the operation of the transducer input control bridge circuit.

Figure 5:
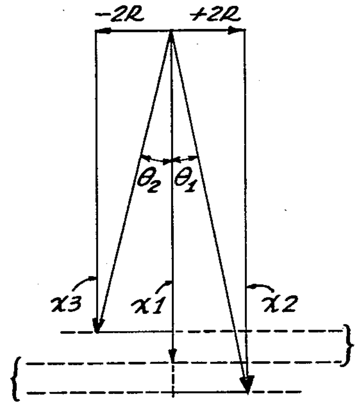

Figure 5 is a graphical vector representation illustrating the non-linearity of phase shift in the bridge circuit.

Figure 6:
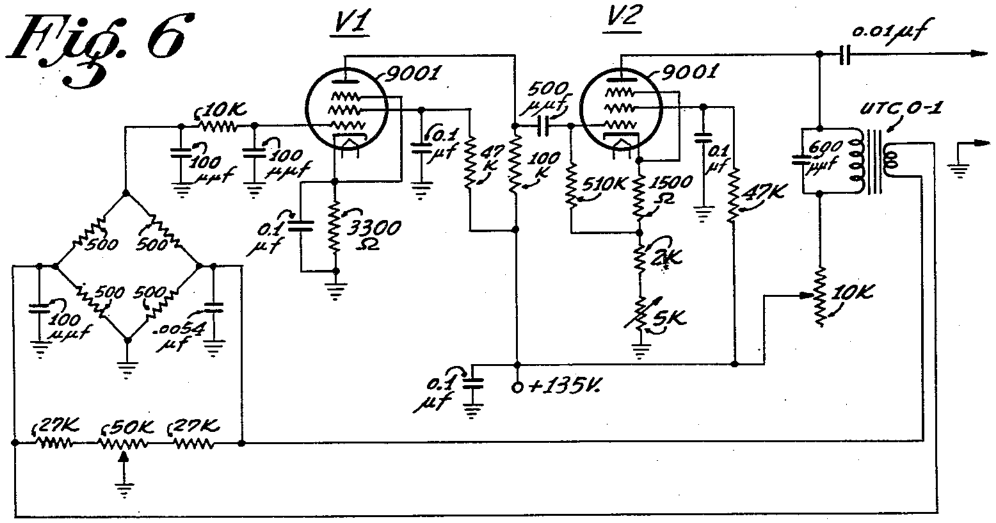

Figure 6 is a descriptive schematic wiring diagram of one arrangement of the oscillator for a 10 kc. subcarrier oscillator.

Figure 1:
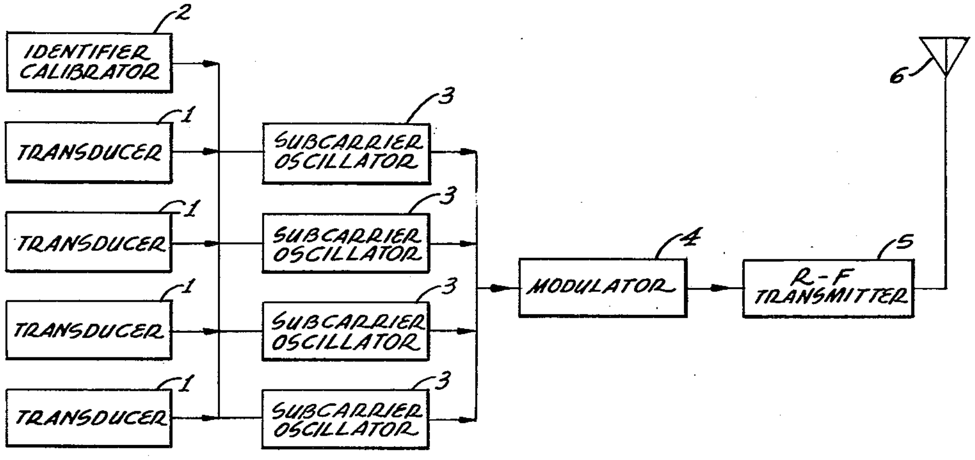
Figure 1 is a schematic block diagram of the transmitting system of a four channel telemetering system.

Reference is first made to the block diagram of the mobile transmitting equipment for use in a telemetering system, Figure 1. The telemetering system, whose particular transmitting system is here referred to and is to be briefly described following, is fully shown, described and claimed in a companion application, Serial No. 205,512, filed January 11, 1951, now Patent No. 2,656,523, Oct. 20, 1953.

In short, the transmitting equipment consists of a plurality of transducers 1, for converting the data to be telemetered into corresponding electrical variations, an identifier-calibrator unit 2, which produces channel identifying and calibrating traces, subcarrier oscillators 3, each of which is frequency modulated by the respective output from the transducers 1, a modulator 4, which amplitude modulates an R. F. carrier in proportion to the input voltage which is derived from the mixed subcarrier signals, and a radio-frequency transmitter 5 and antenna 6, for conveying the data to a receiving station.

Figure 2:
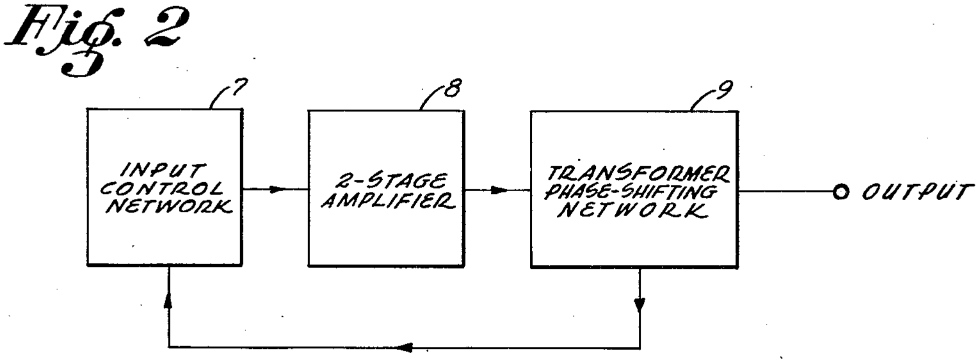
Figure 2 is a block diagram of one of the oscillators used in the system of Figure 1.

Each subcarrier oscillator 3 used in the telemetering system utilizes a phase shift circuit. The oscillator consists broadly of (Figure 2) an input control network 7, which includes the transducers 1 mentioned above, and whose output is amplified by a two stage amplifier 8, providing the necessary amplification. A transformer phase shifting network 9 provides feedback to the input control network 7. The output is taken across the transformer phase shifting circuit 9, and is led to a buffer amplifier.

Figure 3:
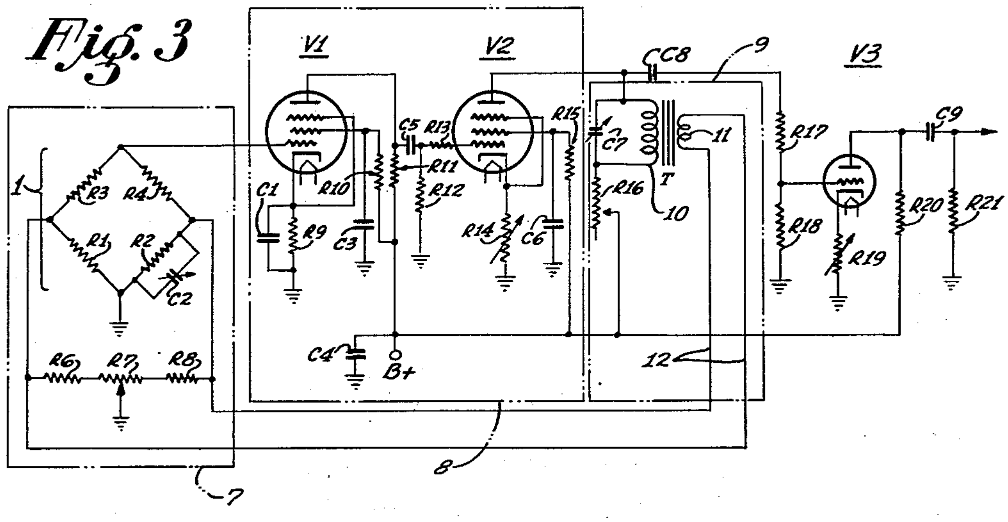
Figure 3 is a schematic wiring diagram of a subcarrier oscillator and amplifier section for a telemetering system in accordance with the present invention.

The subcarrier oscillator and buffer amplifier is detailed in Figure 3. The transducer used in this equipment (Figure 3) is a resistance type accelerometer having four equal active arms, but can be any resistance bridge (including strain gauges) having from one to four active arms. The resistance arms are designated as R1, R2, R3, and R4. A variable condenser C2 is shunted across an arm R2 of the bridge to provide a voltage sufficient to maintain oscillation when the bridge is resistively balanced. When the bridge is unbalanced resistively, the voltage due to the resistive unbalance is in quadrature with that developed by C2 and the phase of the resultant voltage will shift in proportion to the amount of resistive unbalance. The value of C2 controls bridge sensitivity. The input control network 7 is comprised of the bridge and the variable resistive network consisting of R6, R7 and R8. These resistances are placed in series diagonally across the feedback leads of the bridge, in order to compensate for differences in commercial bridges and to resistively balance the effect of C2 on R2. An adjustable point on R7 is grounded, the same as one of the bridge output connections. The value of $R6=R8$ is chosen to provide the desired frequency control over the full range of R7, and R7 is chosen so that the sum of R6, R7 and R8 will be approximately 50 times R1, for example.

The two-stage resistance-capacitance coupled amplifier 8 employs two pentodes V1 and V2. Resistors R10 and R15 are used to drop the B+ voltage to values suitable for screen potentials. The screen voltages are obtained from the plate supply through dropping resistors to avoid critical adjustment of the screen potential. C1, C3, C4 and C6 are bypass condensers. Coupling between stages is provided by the load resistor R11, coupling condenser C5 and grid leak resistor R12 combination. Grid bias is provided by cathode resistors R9 and R14. R14 is a variable un-bypassed cathode resistor in the second stage, and controls the current degeneration developed within that stage. The variable resistor can be adjusted to compensate for differences in the characteristics of tubes of the same type. Without this control it is necessary to carefully choose the two oscillator tubes by trial. Finally, the amplitude of oscillations is kept under control in this stage by a small amount of grid limiting with resistor R13.

The plate circuit of V2 includes the phase shifting transformer T, whose primary winding 10 is in series with a rheostat R16. The phase shift can be varied over a wide range by tuning the primary 10 of the transformer with a capacitor C7. This provides a good initial center frequency adjustment, while more satisfactory vernier control is obtained with the rheostat R16. The secondary winding 11 of transformer T provides feedback to the input bridge control network, through feedback leads 12.

The output of the subcarrier oscillator is applied to a buffer or isolating amplifier V3 by means of a coupling condenser C8, and resistive divider R17 and R18. The buffer amplifier V3 is an ordinary resistance-capacitance coupled amplifier having considerable degeneration. This stage provides isolation between the oscillator circuit proper and other A. F. and R. F. potentials which may appear in the mixing network. A variable resistor R19 in the cathode circuit controls the degeneration in the stage and is used for adjusting the output voltage. Resistors R20 and R21, and condenser C9 provide coupling with other oscillators to a common mixing network. The output from several oscillators is mixed into a common modulation system, hence good waveform from each subcarrier oscillator and good linearity in the mixing network and all following stages should be provided, since linear operation will eliminate modulation products which could produce cross-talk in adjacent channels.

Since the oscillator is largely dependent upon the phase shift through the entire circuit, its operation may be examined from a viewpoint considering the principal sources of phase shift. These components are:

1. The transducer 1.
2. The tubes V1 and V2.
3. The ratio $X_{C5}$ to R12 (see Figure 3).
4. The un-bypassed cathode resistor R14.
5. The transformer T.

Figure 4A:
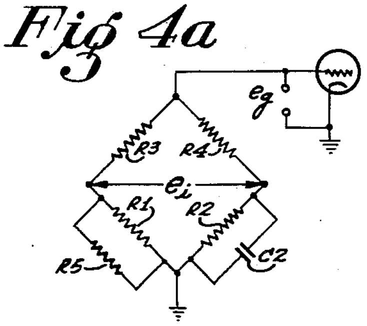
Figure 4B:
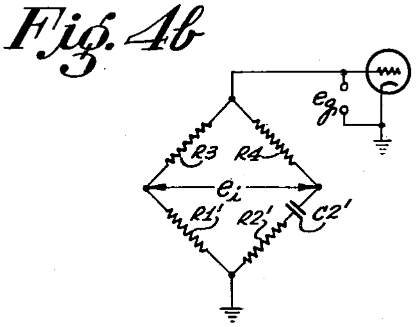

It is seen from Figure 4*a* and its equivalent, Figure 4*b*, that the transducer accelerometer bridge circuit is a particular arrangement of the general Wheatstone net, where $e_1$ is the applied voltage and $e_g$ will be an output voltage due to any unbalance in the bridge. In Figure 4*a*, R1, R2, R3 and R4 are the equal arms of the bridge. C2 is the capacitor controlling frequency-deviation sensitivity and is placed across R2, for example. In order to secure resistive balance, a resistor R5 can be shunted across R1. The variable network R6, R7 and R8 of Figure 3 performs this function in addition to compensating for differences found in commercial bridges.

The equivalent circuit of Figure 4*b* is related to that of Figure 4*a* according to the following equations:

$$R1' = \frac{(R1)(R5)}{R1+R5} \tag{1}$$

$$R2' = \frac{R2}{[(R2)\omega(C2)]^2} - 1 \tag{2}$$

$$C2' = C2 + \frac{1}{(R2)^2\omega^2(C2)} \tag{3}$$

where:

R1' is the series equivalent of the parallel combination of R1 and R5. R2' is the series equivalent of R2 in the parallel C2, R2, arm. C2' is the series equivalent of C2 in the parallel C2, R2, arm. $\omega$ Is equal to $2\pi f$, where $f$ is equal to the oscillating frequency applied. The effect of shunting C2 across R2 is to reduce its equivalent R2' to a value somewhat less than R2, as can be determined from Equation 2. For this reason, a resistor R5 is shunted across R1 so that R1′ is equal to R2′. For resistive balance, $R1'=R2'$ then, $$R5=\frac{1}{\omega^2(C2)^2(R1)} \quad (4)$$

The inductance normally required to balance out the reactance of C2, if balance for both D.-C. and A.-C. were desired (Maxwell inductance bridge), has been purposely omitted. Because of this omission, it is impossible to balance the bridge for an A. C. input voltage. Referring to Figure 4*b* and its voltage vector diagram Figure 4*c* for resistive balance, it is seen that when $R1'=R2'$ and $R3=R4$, the resistive components $e_{R1'}$, $e_{R2'}$, $e_{R3}$ and $e_{R4}$ cancel and the only voltage acting on the control grid of the tube V1 is that developed across the reactance of C2′, or $e_{C2'}$. It is further noted that this vector voltage is in quadrature with the resistive voltage reference plotted on the abscissa, with ground potential taken as the origin. When balanced in this manner, a phase shift of 90° is obtained across the bridge.

Figure 4C:
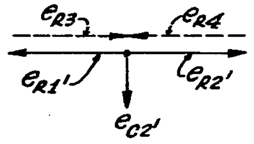

By proper choice of C2, which determines its series equivalent C2′, it is possible to develop a voltage at the control grid of the first tube, shown as $e_{C2'}$ in Figure 4*c*, having a sufficient amplitude to start and maintain oscillation. The oscillation will assume a frequency which, when applied to the several phase shifting networks will produce an overall phase shift equal to an integral multiple of 360°.

Figure 4D:
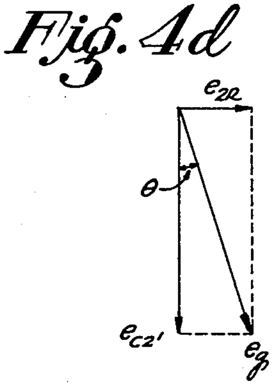

If the accelerometer bridge is subjected to an acceleration, two of the arms, R2 and R3, for example, will each increase in resistance by an amount R as a result of increased tension of the resistance wire, while R1 and R4 will decrease by an equal amount as a result of decreased tension. Figure 4*d* shows the resulting bridge unbalance. The vector voltage $e_g$ is made up of the component voltages $e_{2R}$ and $e_{C2'}$ developed across the resistive unbalance (2R) and the reactive unbalance ($X_{C2'}$), respectively, and the phase shift across the bridge now differs from 90° by a value, $$\tan\theta=\frac{2R}{X_{C2'}}=4\pi(C2)fR+\frac{1}{\pi(R2)^2(C2)}\frac{(R)}{(f)} \quad (5)$$

where $f$ is the frequency of oscillation.

As described above, this phase shift produces a change in the frequency of oscillation. For small values of phase shift the tangent may be replaced by the angle, so that $$\theta=\frac{2R}{X_{C2'}}=4\pi(C2)fR+\frac{1}{\pi(R2)^2(C2)}\frac{(R)}{(f)} \quad (6)$$

This assumption introduces a non-linearity of less than one percent for angles up to 17°.

Taking the derivative of $\theta$ with respect to R in Equation 6, $$\frac{d\theta}{dR}=4\pi(C2)\left[f+R\frac{df}{dR}\right]+\frac{1}{\pi(R2)^2(C2)}\left[\frac{f-R\frac{df}{dR}}{f^2}\right] \quad (7)$$

From the above equation it is seen that if the frequency were to remain constant, the second term in each parenthesis would become zero and the variation of $\theta$ with respect to R would be linear. However, the frequency cannot be considered constant, since the data transmitted is proportional to the frequency deviation, and the sensitivity of the subcarrier oscillator is determined by the magnitude of frequency-deviation produced. For ths reason, as the frequency-deviation sensitivity is increased, the non-linearity of the bridge controlled stage will also increase.

Figure 5 is a graphical representation of the above mentioned non-linearity. X1 is the reactance of C2′ (Figure 4*b*) for center-frequency, i. e., zero acceleration. X2 is its reactance at an increased frequency resulting from a given acceleration, and X3 is its reactance at a reduced frequency resulting from an equal acceleration in the opposite direction. X2 is greater than X1, and X3 is less than X1, as a result of the change in frequency caused by varying R. It is to be noted that an increase in frequency produces an increase in the reactance of the series equivalent capacitor C2′. For small angles, $\theta_1$ will be reduced and $\theta_2$ will be increased from the value that would have resulted if $X1=X2=X3$.

From the above discussion it is seen that changing R in one direction results in shifting $\theta$ to a new value $\theta_1$, increases frequency, increases the magnitude of $X_{C2'}$, and reduces bridge sensitivity. Changing R an equal amount in the opposite direction produces a different phase angle $\theta_2$, reduces frequency, reduces the magnitude of $X_{C2'}$, and increases bridge sensitivity.

Maximum bridge sensitivity is obtained when C2 is small. It is seen from Figure 4*d* that for a given value of R, the smaller the value of $X_{C2'}$, the greater will be the angle $\theta$.

The sensitivity is also indirectly dependent upon the operating potentials, the type of tubes used, the transformer, and any other component which affects the potential applied back to the bridge. If, for example, the plate and screen voltages are increased, the overall amplification will increase, the voltage fed back to the bridge will be increased and a smaller value of C2 can be used to develop the necessary voltage to maintain oscillation. In order to obtain maximum frequency-deviation sensitivity, a value is chosen for C2 which is the smallest value that will provide sufficient feedback voltage for stable oscillation.

To check the bridge for resistive balance, shunt a small capacitor (approximately 20% of C2, Figure 3) across C2. Balance is indicated if the frequency of oscillation does not change. It is not absolutely essential that resistive balance be obtained, however. Good linearity can be had when the bridge is appreciably off resistive balance.

Although several sources of inherent non-linearity have been mentioned in the discussion of the bridge, these do not represent errors unless perfect linearity is assumed. A calibration curve can be made, and if it deviates appreciably from a straight line, readings should be referred to the curve rather than assuming a linear relationship.

Different types of accelerometers having the same resistance values may be used interchangeably, but if it is desired to replace one accelerometer with another having a different resistance value, it will be necessary to change the transformer impedance ratio to a new value given by:

$$Z_b=\frac{Z_aR_a}{R_b} \quad (8)$$

and to change the value of the capacitor controlling frequency-deviation sensitivity (C2 in Figure 4*a*) as given by:

$$C_b=C_a\sqrt{\frac{R_a}{R_b}} \quad (9)$$

where the "*a*" subscripts refer to the original values and the "*b*" subscripts refer to the new values of transformer impedance ratio Z, and resistance R of one arm of the bridge. Thus, if it is desired to change from a 500 ohm to a 250 ohm bridge, the transformer impedance ratio should be doubled and the capacitance of C2 should be multiplied by 1.414.

Preferred accelerometer bridges having resistances of 240 and 500 ohms have given satisfactory performance with this subcarrier oscillator. Early in the development of the oscillator a 120 ohm bridge was used and gave indications of satisfactory operation, although tests using this bridge were incomplete.

For the frequency range of 5 to 40 kilocycles and the circuits under consideration, for example, the effects of inter-element capacitances, lead inductances and transit time are not important for the tubes of the two stage amplifier. The plate resistance of the tube and the impedance of the plate load will largely determine the phase shift in a given stage. If the load is a pure resistance, the shift will be 180°, but if it contains inductive or capacitive components, the shift will be greater or less than this value. The first tube V1 in the present equipment operates strictly class "A" into a purely resistive load. The load of the second tube V2 includes both resistance and inductance, and the shift therefore differs from 180°. The amplitude of oscillations is kept under control in this stage by means of a small amount of grid limiting.

If desired, the frequency may be controlled by choosing C5 and R12 appropriately, although they have been chosen for a negligible shift in the present equipment. (Refer to Figure 3.)

The phase shift introduced is given by:

$$\gamma = \tan^{-1}\frac{1}{\omega(C5)(R12)} \tag{10}$$

Large values of phase shift will require small values of C5 and R12. Assuming that the voltage across R11 remains constant, it is seen that as the phase shift is increased in order to increase operating frequency, the voltage at the control grid of the second tube will be reduced by a multiplying factor of:

$$\frac{1}{\sqrt{1+\frac{1}{\omega^2(C5)^2(R12)^2}}} \tag{11}$$

This requires that, if the output voltage of each of several oscillators is to be maintained at a predetermined level, each channel must be provided with a means of adjusting its output voltage whenever this phase shifting network is adjusted to change frequency.

The voltage appearing between grid and cathode of the second tube V2 is the vector sum of the input voltage and the degenerative voltage developed across R14, and the effect of increasing this degenerative voltage is to produce an output voltage which is more nearly 180° out of phase with the input. For this reason, the phase shift and, therefore, the frequency of oscillation can be controlled by varying the value of the cathode resistor R14 within reasonable limits.

Determination of the exact angle of phase shift in the second stage due to the transformer and the load it reflects into the plate circuit is quite difficult, except by actual measurement. It will vary considerably from one transformer type to another, largely due to different capacities to ground and leakage inductance. In general, phase shift can be varied over a wide range by tuning with a capacitor and more accurately with a series rheostat, as previously described. This variable resistor produces a phase shift as a result of varying the ratio of inductance and resistance in the plate circuit, but does not affect the output voltage greatly.

Thus, if it is desired to increase the operating frequency (center-frequency) of the oscillator, for example, the following are typical adjustments (substantially independent) which may be made:

1. Reduce the capacitance of C7.
2. Increase the resistance of R16.
3. Increase the resistance of R14.
4. Reduce the capacitance of C5.
5. Reduce the resistance of R12.

The frequency limits of operation, however, are determined largely by the transformer. If it is desired to extend the high frequency limit of oscillation, it can be done by choosing a transformer having low shunting capacitance and low leakage inductance. The high permeability core material of good quality midget transformers permits obtaining the necessary primary inductance with fewer primary turns. Unless an excessive amount of interleaving has been employed, this will result in less shunting capacitance. I have found that, with certain transformers, the upper frequency limit can be extended considerably by using only one section of a two section primary winding.

A phase shift choice of 0 or 180° from a particular value may be obtained by reversing connections to one of the windings (preferably the low impedance winding), but generally only one of these two choices will meet the requirements for oscillation.

It may be further noted for minimum output-wave-form-distortion, a non-linear bias control should replace the use of grid limiting, and as much degenerative feedback as will permit stable oscillation should be employed. Such a bias control may consist of a cathode resistor whose resistance increases rapidly with temperature, and where the temperature is in turn proportional to the current flowing through the non-linear resistor.

The present oscillators have been used over a frequency range of approximately 5 to 40 kilocycles, but these values are not to be considered as the limits of the operating range. The center-frequencies chosen for a four channel system are 10, 17, 23.5 and 37 kilocycles, with maximum deviation frequencies equal to approximately 3.5% of center-frequency.

Oscillators built according to the present invention have been successfully used on vehicles subjected to a measured deceleration in excess of 65 gravity units (65 g.), and it is anticipated that they will operate satisfactorily at decelerations over 100 g's.

Figure 6 is a wiring diagram of a preferred example showing component values and details for a 10 kc. subcarrier oscillator. The bridge is a 500 ohm resistance type accelerometer.

From the above description it will be apparent that there is thus provided a device of the character described processing the particular features of advantage before enumerated as desirable, but which obviously is susceptible of modification in its form, proportions, detail construction, and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. A phase shaft oscillator comprising a resistance bridge transducer having input and output connections, means connected to said transducer to provide phase shift of bridge output voltage in either direction relative to bridge input voltage according to the respective direction of resistive unbalance of the bridge, an amplifier having an input connected to said transducer output connections, a tuned transformer having a primary winding connected to an output of said amplifier and having a secondary winding connected to said transducer input connections as a feed back source, a capacitor connected across one of the windings of said transformer for wide tuning of oscillator center-frequency, and a variable resistance connected in series with said primary winding for fine tuning of said center-frequency without appreciably affecting output voltage of said amplifier.

2. Apparatus in accordance with claim 1 including resistive bridge balancing means comprising a potentiometer connected with the ends thereof diagonally across said bridge, and the movable element thereof connected to another portion of said bridge, to initially compensate for the resistive effect of said phase shifting means on said bridge at center-frequency.

3. Apparatus in accordance with claim 1 wherein a pentode tube stage constitutes the output of said amplifier, whereby variation of plate circuit resistance has a relatively small effect upon the magnitude of output voltage and current so that the gain of said amplifier remains substantially constant with frequency adjustment by said variable resistance.

References Cited in the file of this patent

UNITED STATES PATENTS

| | | |
|---|---|---|
| 2,121,447 | Reid | June 21, 1938 |
| 2,272,589 | Steinmetz | Feb. 10, 1942 |
| 2,346,396 | Rider | Apr. 11, 1944 |
| 2,401,214 | Worcester | May 28, 1946 |
| 2,449,072 | Houghton | Sept. 14, 1948 |
| 2,451,858 | Mork | Oct. 19, 1948 |